(12) United States Patent  (10) Patent No.: US 6,668,819 B1
Remsburg  (45) Date of Patent: Dec. 30, 2003

(54) METHOD AND APPARATUS FOR TEMPERATURE CONTROL OF AN ENCLOSURE

(76) Inventor: Ralph Remsburg, 19197 Natures View Ct., Boca Raton, FL (US) 33498

( * ) Notice: Subject to any disclaimer, the term of this patent is extended or adjusted under 35 U.S.C. 154(b) by 1 day.

(21) Appl. No.: 10/039,623

(22) Filed: Dec. 31, 2001

(51) Int. Cl.[7] .................................................. F24J 2/46
(52) U.S. Cl. ...................... 126/633; 126/617; 126/621; 119/482
(58) Field of Search ............................... 126/629, 628, 126/633, 621, 600, 623, 608, 617, 618; 119/448, 436, 482

(56) References Cited

U.S. PATENT DOCUMENTS

| | | | | |
|---|---|---|---|---|
| 2,777,253 A | * | 1/1957 | Bensin | 126/621 |
| 4,119,084 A | | 10/1978 | Eckels | |
| 4,420,036 A | | 12/1983 | Blaser | |
| 4,462,334 A | * | 7/1984 | Kim | 126/633 |
| 4,495,937 A | * | 1/1985 | Fisher | 126/633 |
| 4,512,334 A | * | 4/1985 | Peachey | 126/631 |
| 4,696,260 A | * | 9/1987 | Panessidi | 119/482 |
| 5,551,371 A | * | 9/1996 | Markey et al. | 119/482 |
| 5,746,271 A | * | 5/1998 | DeCosta | 119/448 |
| 5,887,436 A | | 3/1999 | Duddleston | |
| 5,937,792 A | * | 8/1999 | Madrid | 119/482 |
| 6,104,611 A | | 8/2000 | Glover et al. | |

* cited by examiner

*Primary Examiner*—Josiah Cocks
(74) *Attorney, Agent, or Firm*—Timothy M. Barlow

(57) ABSTRACT

A structure or enclosure with a solar energy absorbing system, arranged so that at least one wall faces the sun and at least one wall is shaded. The structure has a thermal switch between the solar energy absorbing unit and a solar energy storage unit. The structure has a thermal switch between the solar energy storage unit and the interior. The structure has a thermal switch between the shaded wall of the structure and a heat dissipating heat sink. The thermal switch between the solar energy absorbing unit and the solar energy storage unit is modular and is replaceable with other thermal switches having different temperature set points. The thermal switches control the temperature of the interior of the structure in varying climates and sunlight conditions to within a desirable and limited range.

4 Claims, 10 Drawing Sheets

METHOD AND APPARATUS FOR TEMPERATURE CONTROL OF AN ENCLOSURE

FEDERALLY SPONSORED RESEARCH

Not Applicable

SEQUENCE LISTING OR PROGRAM

Not Applicable

BACKGROUND

1. Field of the Invention

Figure 1:
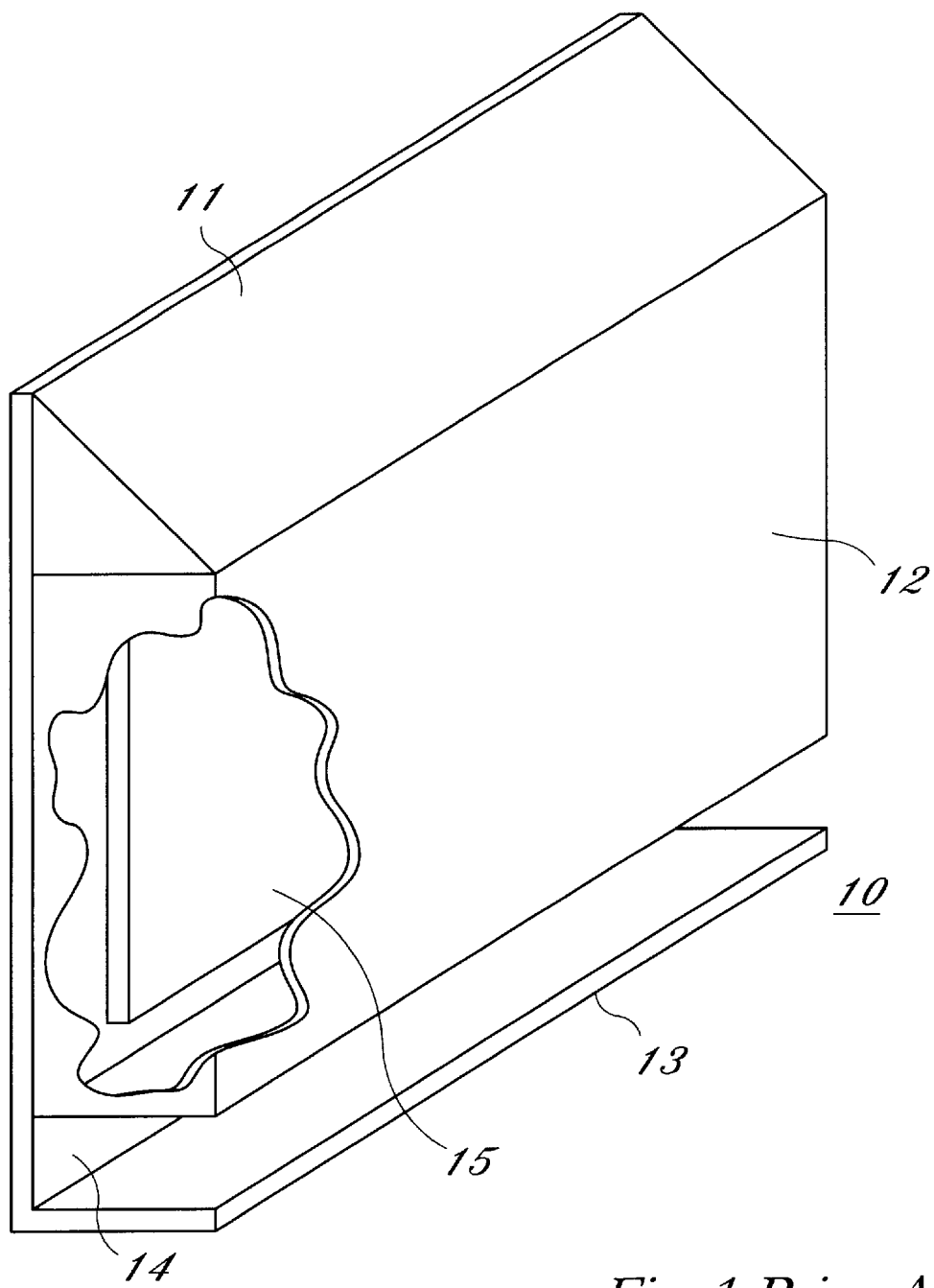

The present invention relates generally to efficient thermal-mechanical control of thermal energy flow paths in systems which require thermal energy transfer. The invention is directed to systems for the collection, storage, and transfer of solar heat energy, and more specifically to systems that control operating temperatures in enclosures.

2. Description of Prior Art

Many different types of solar heated and cooled enclosures and building structures have been proposed during the course of many years. The common elements for the utilization of solar energy include a solar heat collector, a storage unit, and a heat transfer conduit to transfer the thermal energy between the collector and the storage unit. Such a system, of course, requires a sophisticated control system for operating the heat transfer conduit and control unit in relation to the weather conditions, the heat demand of the structure, etc. When the units also include an air conditioner, such elements as a compressor, evaporator, cooling coils, and the like are in addition to the other elements. In each case the unit uses a substantial amount of energy for the operation of the elements for movement of the heat transfer conduit and for the control system for operations. Very few passive units for either solar heating or cooling have been found to be effective.

Within the prior art there are numerous examples of systems for thermal energy transfer and control of enclosures. U.S. Pat. No. 4,119,084 to Eckels, issued Oct. 10, 1978 is an earlier class of device directed to controlling temperature in small enclosures. A more recent example is prior art U.S. Pat. No. 6,104,611 to Glover et al issued Aug. 15, 2000. One severe problem that the devices in this class do not address is the eventuality that the external ambient temperature is much lower than the desired internal temperature of the enclosure. In particular, prior art devices similar to that taught by Eckels would transfer the desirable internal heat to the outside by way of the very efficient solar collector that may also act as a thermal radiator.

Other recent examples of prior art enclosures for pets such as U.S. Pat. No. 5,887,436 to Duddleston issued Mar. 30, 1999, teach the use of thermoelectric coolers. These devices are highly inefficient and may generate ten times as much heat as the heat drawn away from the enclosure. In addition, devices based upon the teachings of Duddleston are not suitable for remote outdoor applications because they require very large, expensive, and short-lived batteries.

Many other prior art examples use air circulating through the enclosure for cooling. U.S. Pat. No. 4,420,036 to Blaser issued Dec. 13, 1983 discloses an energy efficient enclosure cooled by an envelope of circulating air. Humans and most animals alike do not like to be cooled in a constant stream of high velocity air. Bats in particular avoid moving air enclosures and prefer static air environments such as attics and caves.

BACKGROUND—OBJECTS AND ADVANTAGES

The preferred embodiment of the invention is directed to providing housing for bat colonies. A multitude of housing designs have been tried to successfully lure bats to reside in an enclosure. One of the primary reasons bats choose a specific enclosure is the internal temperature and temperature range of the enclosure. One of the reasons for the multitude of bat house designs is the variety of thermal conditions in the world. Bat houses in the southern Unites States may require cooling vents to keep the structure from becoming too hot and the use of lighter colors to attenuate solar energy absorption. In the northern Unites States vents are eliminated and darker colors are used to maximize solar energy absorption. Most bat houses are much larger than the bats require, because the variance in temperature of the enclosure forces the bats to continually move to different areas of the enclosure that are within a comfortable temperature range. The physical location of the area within the enclosure of comfortable temperature changes during the day as the sun's position changes and from day to day as the ambient air temperature changes. Often, many bat houses are initially erected in a specific location in order to find the single enclosure that the bats will reside in. In one experiment, three different bat houses were erected on a residential home. After a year with no habitation in any of the enclosures, bats were found to have started a colony in the attic of the home.

According to the present invention there is provided a passive solar heating and cooling system for buildings, structures, and enclosures, and this provides a major object and advantage of the invention.

Another object of the invention is to provide a controlling system for small enclosures such as dog houses, bat houses or the like, having means for heating, storage of solar thermal energy, and means for cooling the structure.

A further object of the invention is to automatically control the absorption and release of thermal energy from a structure in order to maintain the temperature of the structure within a desired and limited range.

Yet another object of the invention is to incorporate modular temperature control units such that by changing a module, the temperature range of the structure can be easily changed.

And still another object of the invention is to incorporate an easily adjustable solar collector that can be set for optimum efficiency with a single adjustment, so that combined with the modular temperature controller of the invention provides a universal basic enclosure.

An additional embodiment of the invention contains the basic elements of the thermal switches and thermally conductive structure configured as a dog house.

Heretofore, there has been no enclosure design that has provided the desirable universatility along with individualized heating and cooling control capacity taught by the present invention.

SUMMARY

In accordance with the present invention an enclosure comprises thermal switches to control the absorption and dissipation of solar thermal energy, a thermal energy storage unit, a novel modular thermal switch, and thermally conductive walls to distribute the thermal energy evenly throughout the structure.

DRAWINGS

Drawing Figures

FIG. 1 An isometric view of a prior art bat house.

Figure 2:
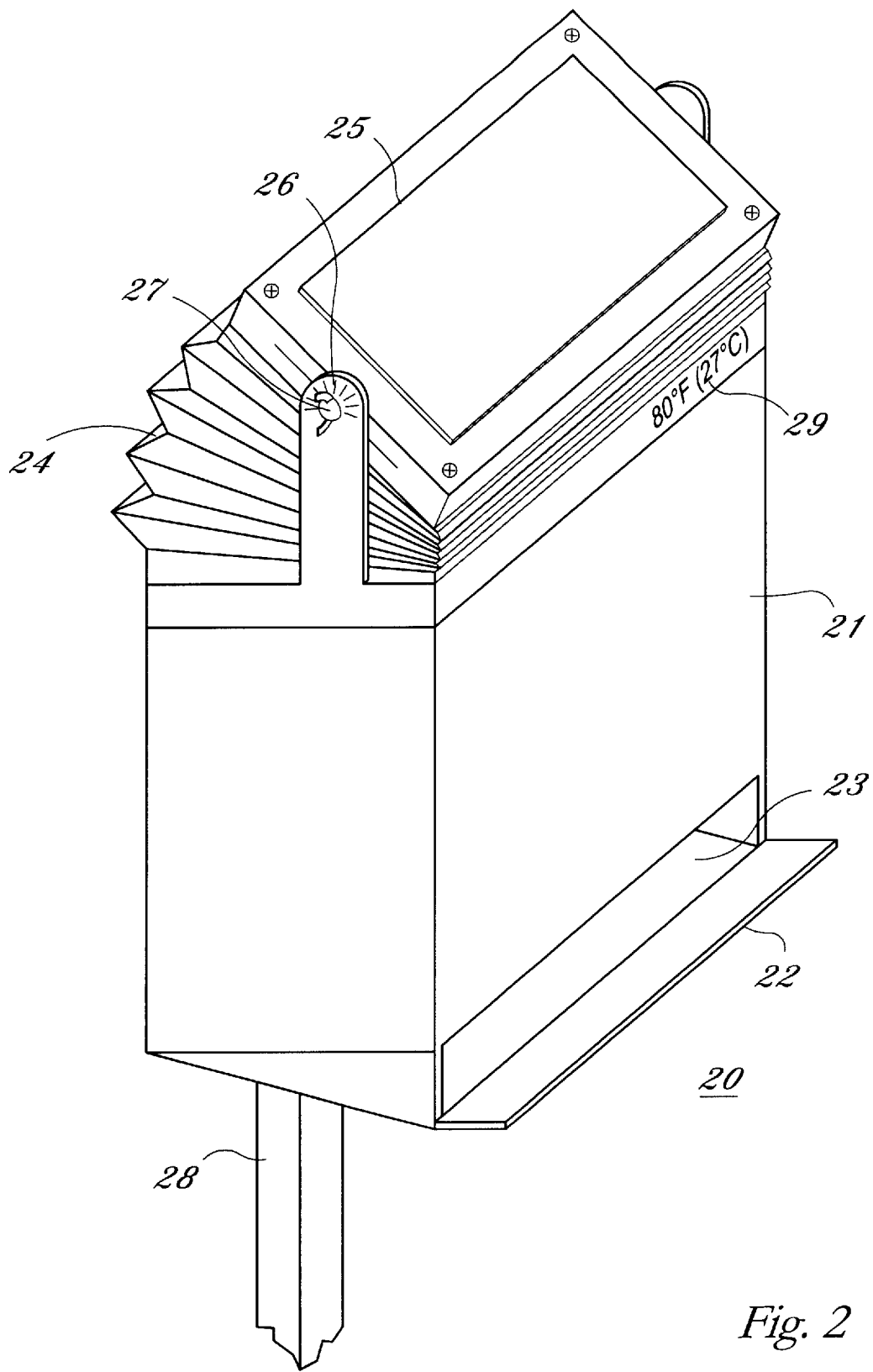

FIG. 2 An isometric view of the entrance side, also noted as the solar energy absorbing side of the bat house of the present invention.

Figure 3:
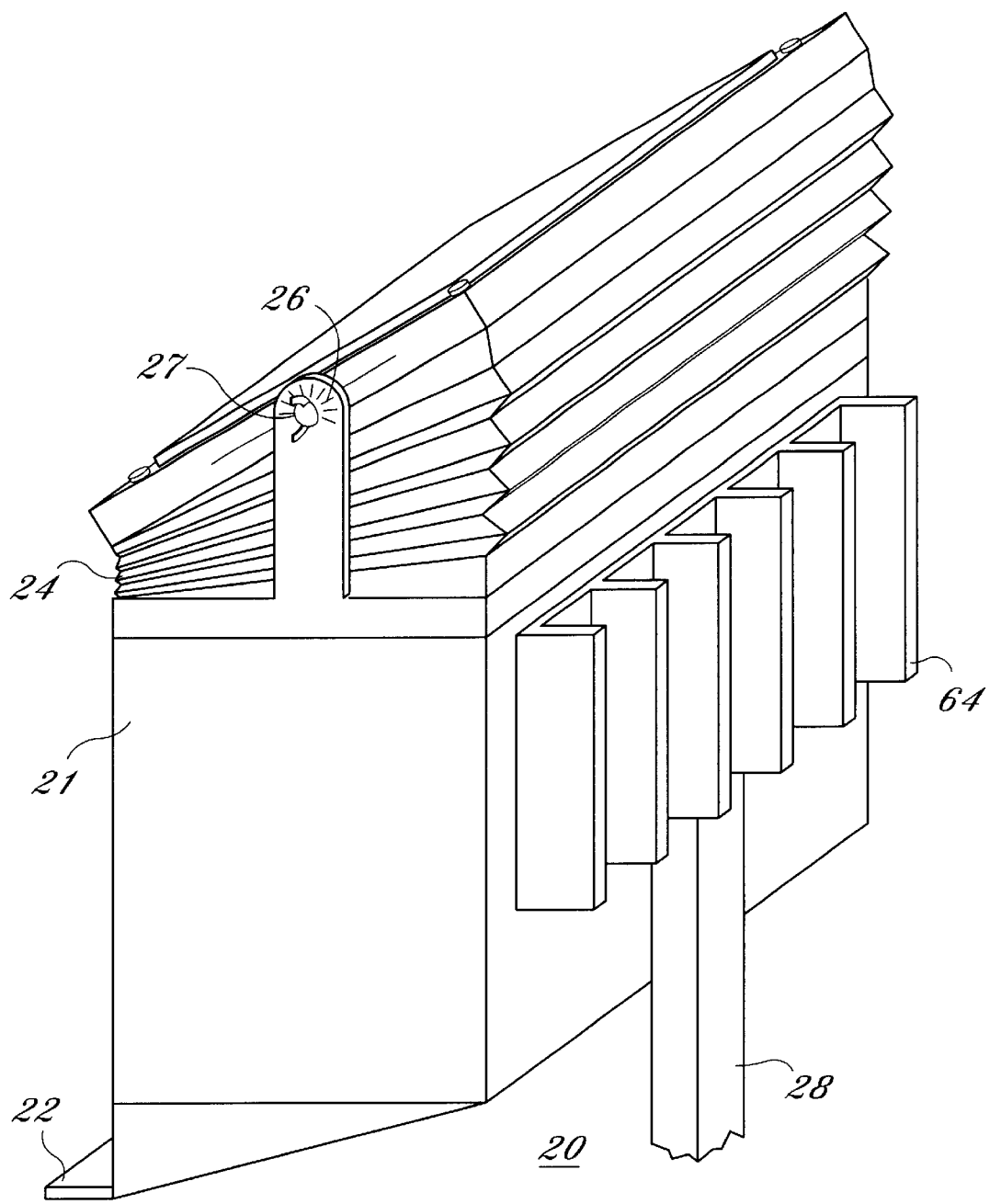

FIG. 3 An isometric view of the heat dissipation side of the bat house.

Figure 4:
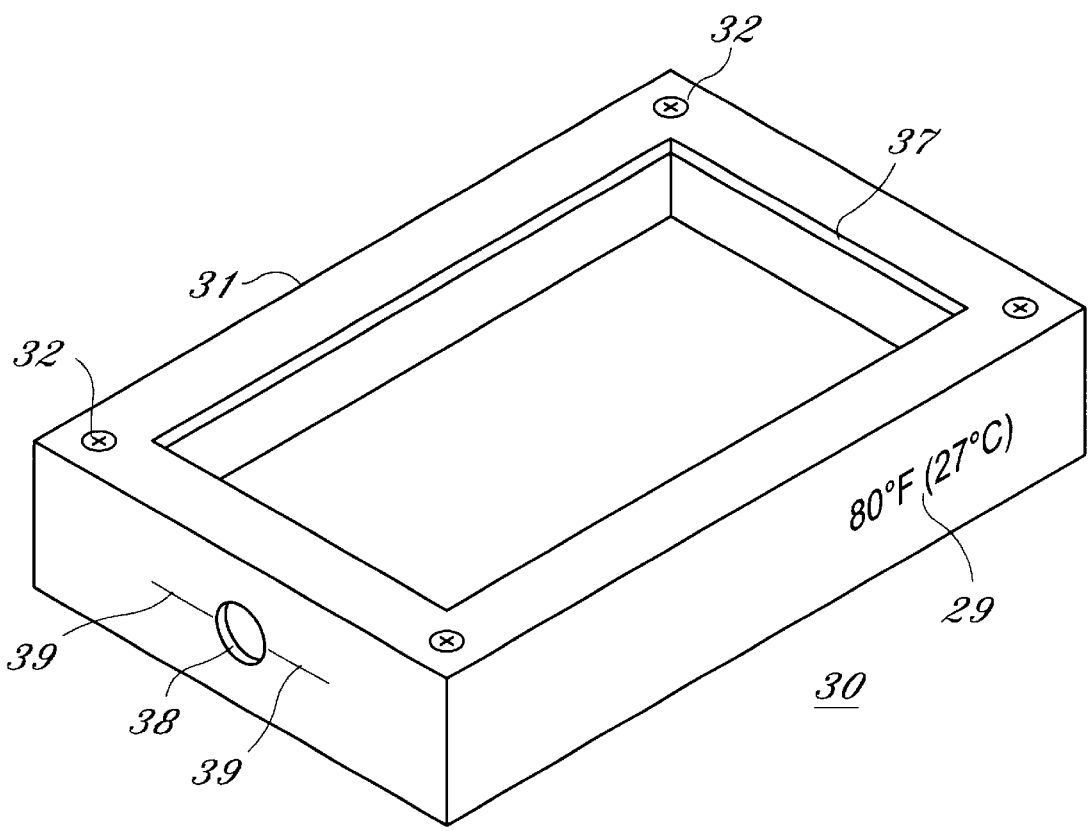

FIG. 4 An isometric view of the modular thermal switch assembly.

Figure 5A:
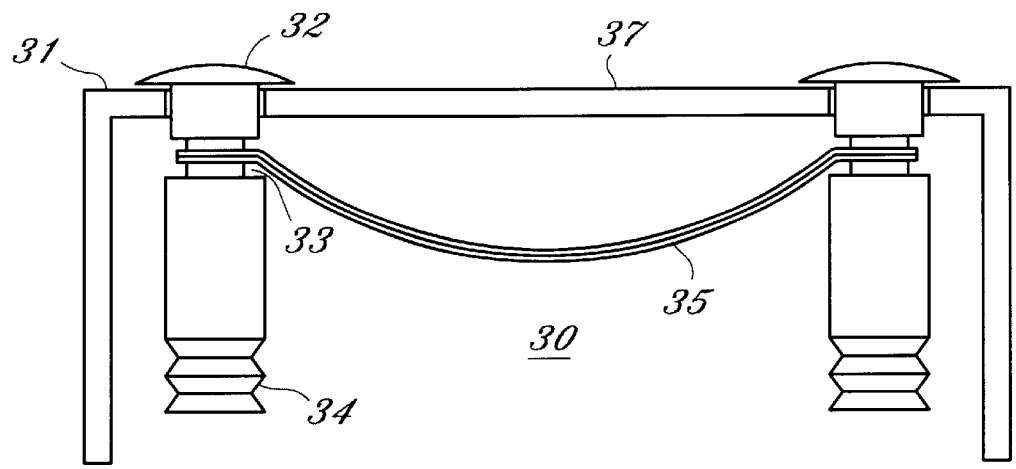

FIG. 5 comprising:

FIG. 5a A cutaway view of the modular thermal switch assembly.

Figure 5B:
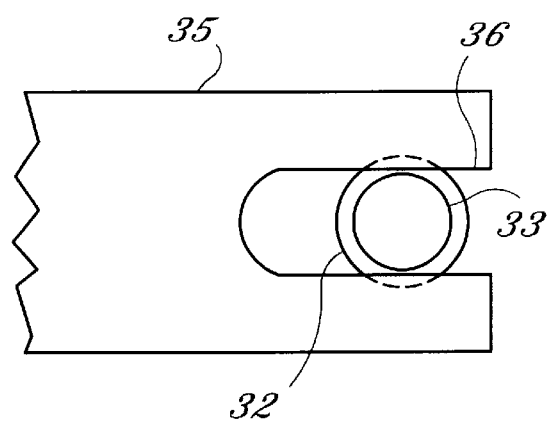

FIG. 5b A view of one end of the bimetallic element assembled to the grooved section of the shoulder bolt.

Figure 6:
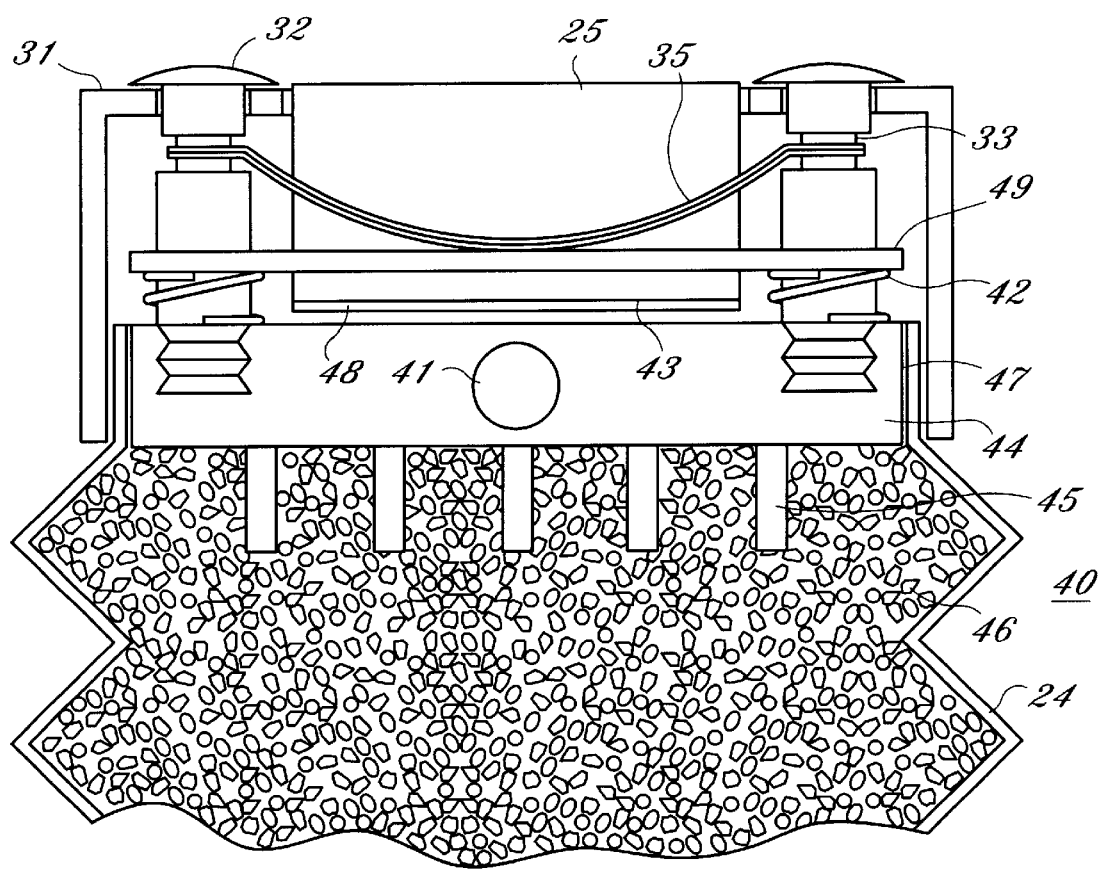

FIG. 6 A cutaway view of the solar energy collector assembly.

Figure 7:
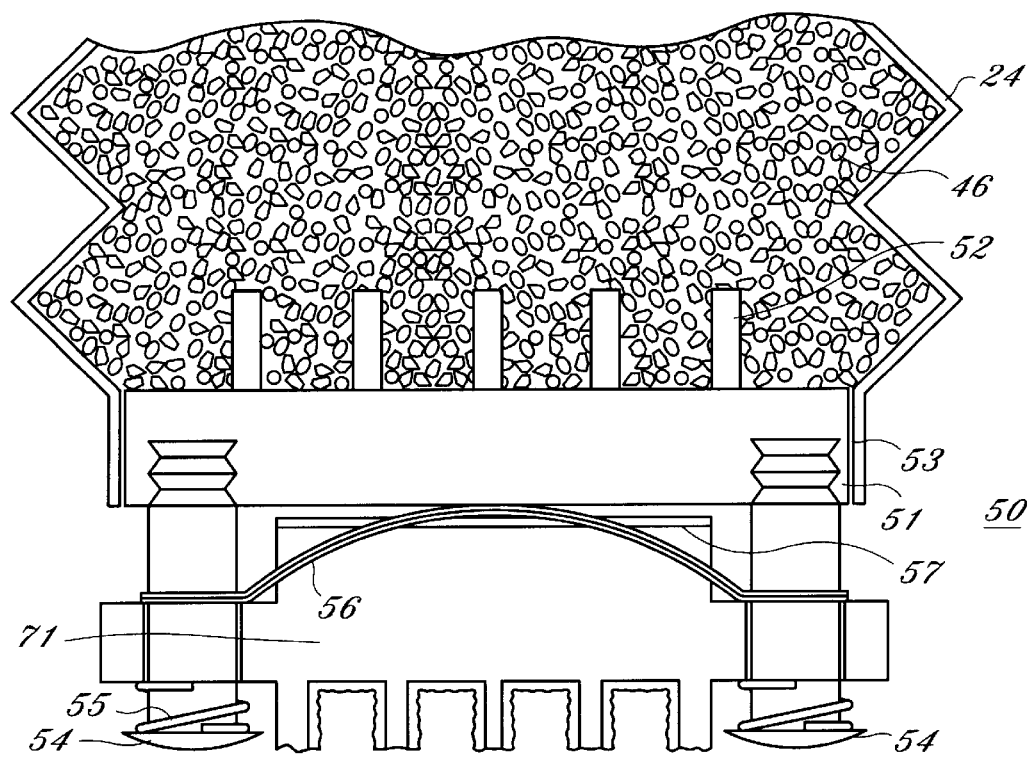

FIG. 7 A cutaway view of the enclosure thermal switch assembly.

Figure 8:
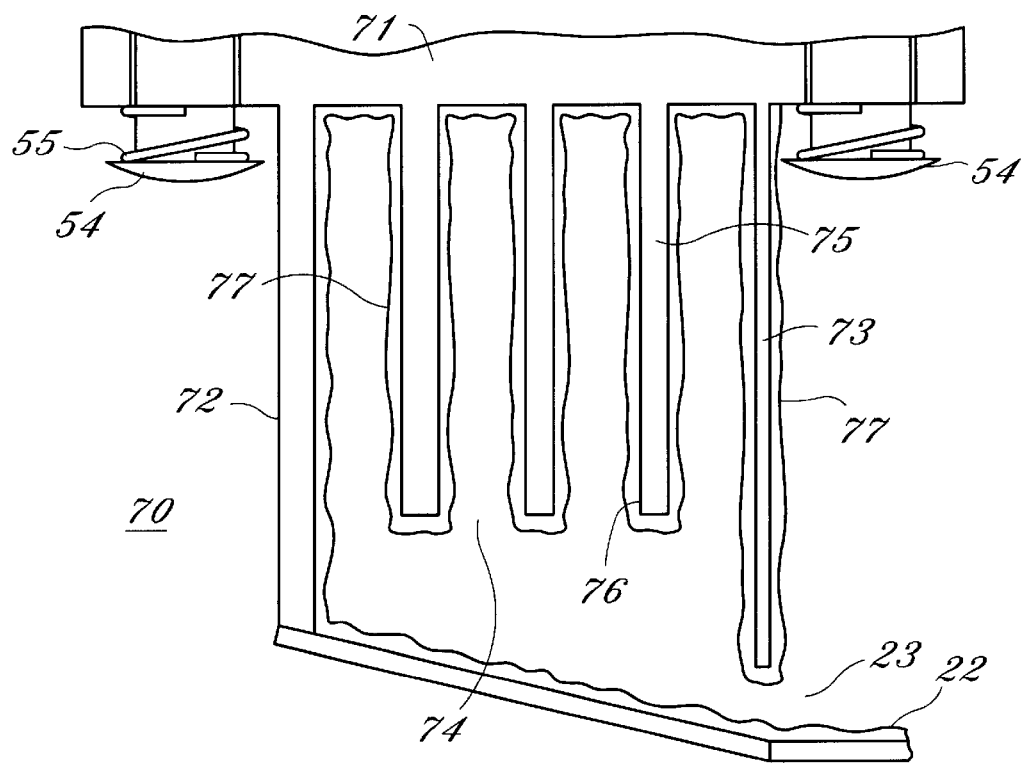

FIG. 8 A cutaway view of the bat house enclosure assembly, also noted as the thermal conduit structure.

Figure 9:
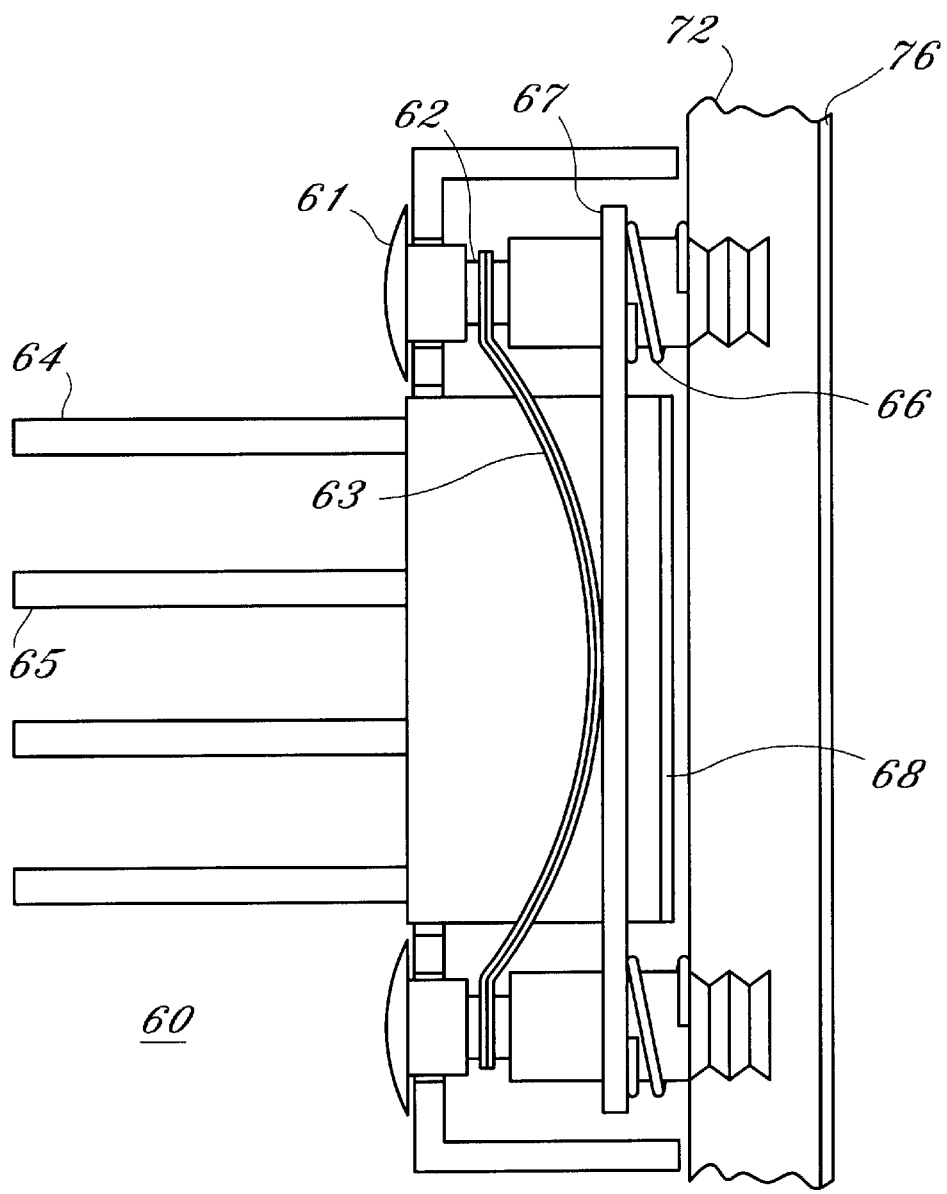

FIG. 9 A cutaway view of the enclosure heat dissipation assembly.

Figure 10:
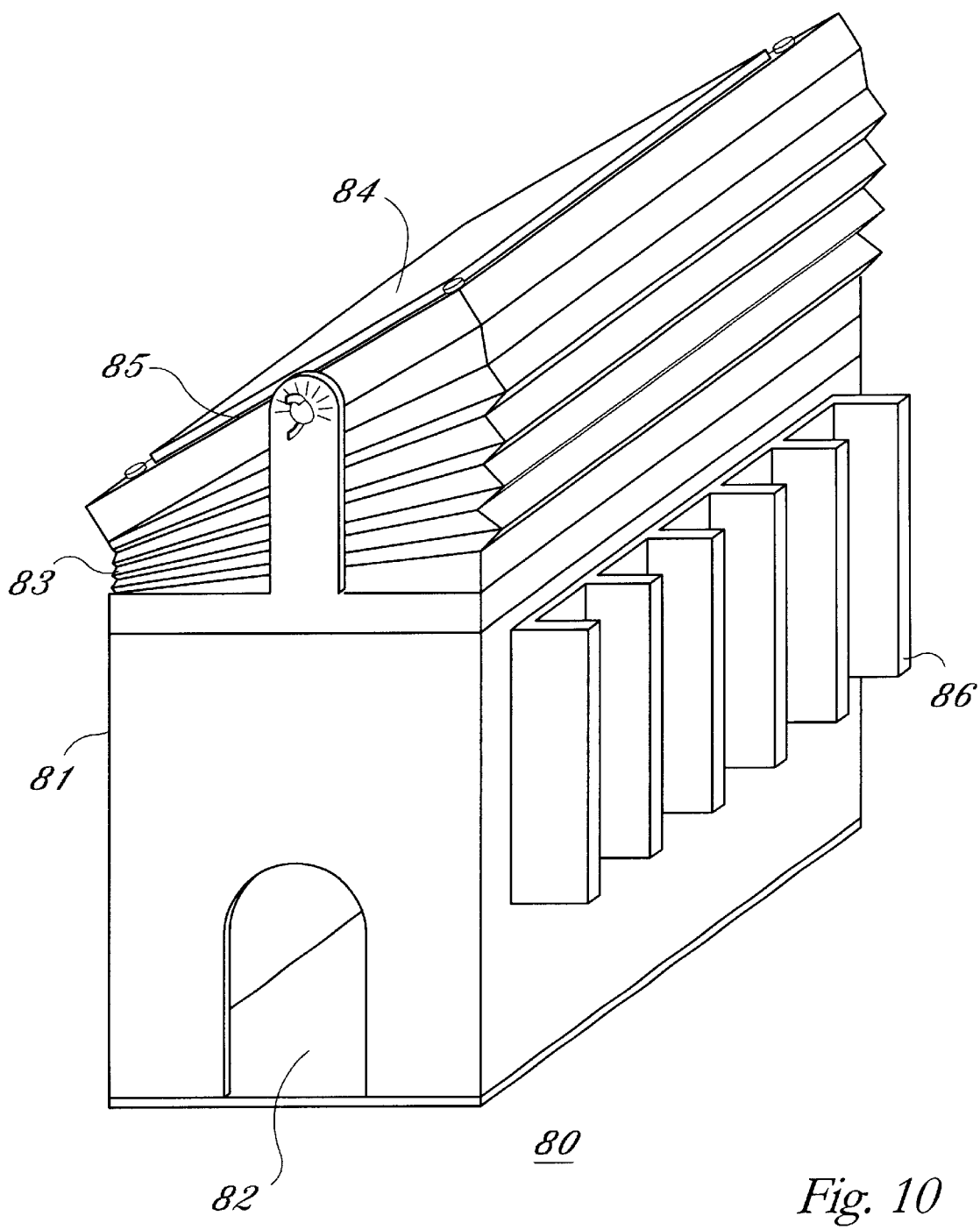

FIG. 10 An isometric view of an additional embodiment of the invention shown as a dog house.

REFERENCE NUMERALS IN DRAWINGS

10 Prior Art Bat House
11 Prior Art Bat House Roof
12 Prior Art Bat House Enclosure
13 Prior Art Bat House Landing
14 Prior Art Bat House Entry
15 Prior Art Bat House Roost Area
20 Bat House Assembly
21 Natural Surface Exterior
22 Bat House Landing
23 Bat House Entry
24 Phase Change Material Bellows
25 Solar Energy Collector
26 Sun Altitude Indicator
27 Thumbscrew
28 Support Pole
29 Modular Switch Set Point Label
30 Modular Thermal Switch Assembly
31 Modular Switch Cover
32 Modular Switch Shoulder Screw
33 Modular Switch Shoulder Screw Groove
34 Modular Switch Shoulder Screw Thread Section
35 Modular Switch Bimetallic Element
36 Modular Switch Bimetallic Element Cutout
37 Modular Switch Cover Opening
38 Modular Switch Sun Altitude Indicator Hole
39 Modular Switch Sun Altitude Indicator Mark
40 Solar Energy Collector Assembly
41 Thumbscrew threaded hole
42 Solar Energy Collector Spring
43 Solar Energy Collector Heat Transfer Surface
44 Solar Energy Collector Phase Change Plate
45 Solar Energy Collector Phase Change Plate Fins
46 Phase Change Material
47 Solar Energy Collector Bellows Seal
48 Solar Energy Collector Heat Transfer Thermal Pad
49 Solar Energy Collector Land
50 Enclosure Thermal Switch Assembly
51 Enclosure Phase Change Plate
52 Enclosure Phase Change Plate Fins
53 Enclosure Switch Bellows Seal
54 Enclosure Switch Shoulder Screw
55 Enclosure Switch Spring
56 Enclosure Switch Bimetallic Element
57 Enclosure Heat Transfer Thermal Pad
60 Enclosure Heat Sink Thermal Switch Assembly
61 Heat Sink Switch Shoulder Screw
62 Heat Sink Switch Shoulder Screw Groove
63 Heat Sink Switch Bimetallic Element
64 Heat Sink
65 Heat Sink Fins
66 Heat Sink Switch Spring
67 Heat Sink Land
68 Heat Sink Heat Transfer Thermal Pad
70 Bat House Enclosure Assembly
71 Bat House Thermal Conduit Structure
72 Enclosure Rear Wall
73 Enclosure Front Wall
74 Enclosure Bat Roost Area
75 Roost Heat Transfer Conduit
76 Roost Thermal Adhesive
77 Roost Natural Surface
80 Additional Embodiment Dog House Assembly
81 Dog House Surface Exterior
82 Dog House Entry Opening
83 Phase Change Material Bellows
84 Solar Energy Collector
85 Sun Altitude Indicator
86 Heat Sink

DETAILED DESCRIPTION—PRIOR ART

Referring to FIG. 1 a prior art bat house 10 is shown. The prior art bat house consists of a prior art bat house enclosure 12 and a prior art bat house roof 11. A prior art bat house landing 13 is located near a prior art bat house entry 14. Inside the bat house shown through a cutaway section is a prior art bat house roost area 15. Bat houses of this type may become too hot inside prior art bat house roost area 15 especially near prior art bat house roof 11. A variety of materials may be used to construct the prior art bat house. Plastic, fiberglass, various woods, plaster, and concrete to name just a few have been used successfully. The bat house of the prior art must be painted a color that will allow prior art bat house roost area 15 to achieve the correct temperature through solar energy absorption. The correct color to achieve this temperature is usually unknown until after experimentation. Currently, the prior art bat house must be erected and left undisturbed for a summer season. At that point the prior art bat house may be opened for signs of habitation. If no habitation is apparent, changes are made through trial and error in the structure and color to allow prior art bat house roost area 15 to achieve the correct temperature through solar energy absorption.

DETAILED DESCRIPTION—PREFERRED EMBODIMENT

Referring to FIG. 2 a bat house assembly 20 of the present invention is shown. The bat house assembly has a natural surface exterior 21. In the preferred embodiment natural surface exterior 21 is outer bark from a tree. A bat house landing 22 is shown leading to a bat house entry 23. Bat house landing 22 is also covered with natural surface exterior 21. A phase change material bellows 24 allows a solar energy collector 25 to be rotated to an angle matching the sun's altitude. The angle of solar energy collector 25 is shown by a sun altitude indicator 26. Solar energy collector 25 is held at a set angle by a thumbscrew 27. A support pole 28 elevates the bat house to a desirable height. Phase change bellows 24 should be constructed of a flexible material that will maintain flexibility throughout its lifetime in an outdoor environment with direct sun exposure. Solar energy collector 25 should be constructed from a thermally conductive material such as aluminum. The solar energy collector should be painted, anodized, or some other process whereas the exterior surface will absorb the maximum amount of solar energy. The materials used to construct sun altitude indicator 26, thumbscrew 27, and support pole 28 are unimportant.

Referring now to FIG. 3 the heat dissipating side of the bat house is shown. A large heat sink 64 controlled by a thermal switch 60 [(not shown)] may be used to dissipate excess thermal energy to the ambient environment.

Referring to FIG. 4, a novel modular thermal switch assembly 30 is shown. The modular thermal switch assembly comprises a modular switch cover 31 and at least one modular switch shoulder screw 32. Modular switch cover 31 has a large modular switch cover opening 37. On opposite ends of the modular thermal switch is a modular switch sun altitude indicator hole 38 and a modular switch sun altitude indicator mark 39. Modular thermal switch assembly 30 has a temperature set point. In the preferred embodiment modular thermal switch assembly 30 will be produced in a variety of temperature set points. Modular switch set point label 29 will show the temperature switch point that the unit will operate. At least two and possibly four modular switch bimetallic elements 35 (not shown) will be suspended between each modular switch shoulder screw 32. Modular switch cover 31 may be made from an inexpensive material such as plastic. Preferably the cover has a flat black finish for maximum solar energy absorption. Modular switch sun altitude indicator mark 39 may be a raised or recessed straight line. The marks should be easily visible.

FIG. 5*a* shows a cutaway view of modular thermal switch assembly 30 revealing elements that are not shown in the isometric view of FIG. 4. Modular switch shoulder screw 32 contains a modular switch shoulder screw groove 33 and a modular switch shoulder screw thread section 34. Attached to each pair of shoulder screws is modular switch bimetallic element 35.

Referring now to FIG. 5*b*, modular switch bimetallic element 35 has a modular switch bimetallic element cutout 36 at each end. The cutout is sized to match modular switch shoulder screw groove 33 in modular switch shoulder screw 32. The shoulder screws can be constructed of steel or another thermally conductive material. It is desirable that heat travels through modular switch shoulder screw thread section 34 through modular switch shoulder screw 32 and into modular switch bimetallic element 35. Bimetallic elements are well known in the art. Modular switch bimetallic element 35 is preformed into a shape that will produce a desired amount of deflection depending on the initial mechanical holding force required at minimum temperature, the desired maximum thermal interface force at maximum temperature, and other geometrical considerations. Modular switch bimetallic element 35 is a composite formed as an arc and is composed of a high expansion material bonded to a low expansion material.

FIG. 6 shows a cutaway view of modular thermal switch 30 which is part of a solar energy collector assembly 40. Phase change material bellows 24 contains a phase change material 46. The phase change material is in thermal contact with a solar energy collector phase change plate 44. Solar energy collector phase change plate 44 has a solar energy collector land 49. On one side of the phase change plate is a plurality of thermally conductive solar energy collector phase change plate fins 45 that are immersed in the phase change material. A solar energy collector bellows seal 47 is formed between solar energy collector phase change plate 44 and phase change material bellows 24 to contain phase change material 46. Solar energy collector 25 has one surface that protrudes through the modular switch cover opening. 37 of modular switch cover 31. The opposite surface of the solar thermal energy collector is optimized as a solar energy collector heat transfer surface 43 and has a very smooth finish. Attached to this surface is a thermally conductive solar energy collector heat transfer pad 48. Solar energy collector phase change plate 44 has a thumbscrew threaded hole 41 that receives thumbscrew 27 (not shown). Each modular switch shoulder screw 32 has a solar energy collector spring 42. Solar energy collector spring 42 is normally constructed of spring steel. Solar energy collector phase change plate 44 should be thermally conductive and can be made from the same material, such as aluminum, as solar energy collector phase change plate fins 45. A variety of processes and materials may be used to construct solar energy collector bellows seal 47. Adhesives, o-rings, and fillers have all been used successfully. Phase change material 46 is well known in the art and may be obtained in a variety of temperature ranges, efficiencies, and packagings. In the preferred embodiment for Mexican free-tailed bats phase change material 46 has a transition temperature of 97° F. (36C) and is contained in small plastic spheres. As the phase change material is heated it will absorb a large quantity of heat before the temperature of the material rises above the transition temperature. Upon cooling the phase change material will release the absorbed heat before the temperature of the material drops below the transition temperature. Different bat species seem to prefer different roost temperatures. Phase change material 46 should have a transition temperature as close to the preferred roost temperature for the desired bat species as possible.

FIG. 7 shows a cutaway view of an enclosure thermal switch assembly 50. An enclosure phase change plate 51 has a plurality of thermally conductive enclosure phase change plate fins 52 that are immersed in the phase change material. An enclosure switch bellows seal 53 is formed between enclosure phase change plate 51 and phase change material bellows 24 to contain phase change material 46. The opposite surface of enclosure phase change plate 51 is optimized as a heat transfer surface and has a very smooth finish. Attached to this surface is a thermally conductive enclosure heat transfer thermal pad 57. Pluralities of enclosure switch shoulder screw 54 are used. Each shoulder screw has an enclosure switch spring 55. Enclosure switch spring 55 is normally constructed of spring steel. Enclosure phase change plate 51 should be thermally conductive and can be made from the same material, such as aluminum, as enclosure phase change plate fins 52. A variety of processes and materials may be used to construct enclosure switch bellows seal 53. Adhesives, o-rings, and fillers have all been used successfully. Enclosure switch shoulder screw 54 can be constructed of steel or another thermally conductive material. It is desirable that heat travels through the shoulder screw from enclosure phase change plate 51 and into an enclosure switch bimetallic element 56. Enclosure switch bimetallic element 56 is similar in material and operation to modular switch bimetallic element 35. Enclosure switch bimetallic element 56 is a composite formed as an arc and is composed of a high expansion material bonded to a low expansion material.

FIG. 8 shows a cutaway view of a bat house enclosure assembly 70. The bat house enclosure assembly is built upon a bat house thermal conduit structure 71. An enclosure front wall 73, enclosure rear wall 72 and side walls form the outer part of the enclosure. Inside the enclosure is an enclosure bat roost area 74. The bat roost area is divided into sections by a plurality of thermally conductive roost heat transfer conduit 75. In the preferred embodiment, all exposed internal walls of the entire bat roost area are covered by a roost natural surface 77 material. Roost natural surface 77 can be identical to the material used for natural surface exterior 21 and can be the outer bark from a tree. Roost natural surface 77 and natural surface exterior 21 are attached to the thermal structure and roost heat transfer conduit dividers by a roost thermal adhesive 76. The thermal conduit structure and all walls and dividers are constructed of a thermally conductive material such as aluminum. Thermally conductive roost thermal adhesive 76 can be made from a variety of such adhesives well known in the art.

FIG. 9 shows a cutaway view of an enclosure heat sink thermal switch assembly 60. A heat sink 64 has a plurality of thermally conductive heat sink fins 65 that are in contact with the ambient environment on one side. It is important that heat sink fins 65 are on the side of bat house assembly 20 that does not receive sun exposure. The opposite surface of heat sink 64 is optimized as a heat transfer surface and has a very smooth finish. Attached to this surface is a thermally conductive heat sink heat transfer pad 68. A plurality of heat sink switch shoulder screw 61 is used to attach heat sink thermal switch assembly 60 to an enclosure rear wall 72. Heat sink switch shoulder screw 61 contains a heat sink switch shoulder screw groove 62. Attached to each pair of shoulder screws is a heat sink switch bimetallic element 63. When heat sink switch bimetallic element 63 deforms due to heat, it acts on heat sink 64 by a heat sink land 67. The heat sink land can be machined from the same material as the heat sink and must be thermally conductive. Each shoulder screw has a heat sink switch spring 66. Heat sink switch spring 66 is normally constructed of spring steel. Heat sink 64 should be thermally conductive and can be made from the same material, such as aluminum, as heat sink fins 65. Heat sink switch shoulder screw 61 can be constructed of steel or another thermally conductive material. It is desirable that heat travels through the shoulder screw from enclosure rear wall 72 and into heat sink switch bimetallic element 63. Heat sink switch bimetallic element 63 is similar in material and operation to modular switch bimetallic element 35. Heat sink switch bimetallic element 63 is a composite formed as an arc and is composed of a high expansion material bonded to a low expansion material.

OPERATION—PREFERRED EMBODIMENT

Referring to FIGS. 4, 5 and 6, modular thermal switch assembly 30 and solar energy collector assembly 40 are shown. Solar energy collector assembly 40 is a normally open thermal switch. When the temperature of solar energy collector 25 exceeds the set point of solar energy collector assembly 40, modular switch bimetallic element 35 will attempt to lengthen due to the coefficient of thermal expansion. The resulting force will push against modular switch shoulder screw 32 at both ends of modular switch bimetallic element 35 since modular switch bimetallic element 35 is captured at each end by modular switch shoulder screw groove 33. Modular switch bimetallic element 35 can not grow longer, so it will deflect in a predisposed direction. Therefore modular switch bimetallic element 35 will push against solar energy collector land 49 and act against the force of solar energy collector spring 42. When the force of modular switch bimetallic element 35 overcomes the force of solar energy collector spring 42, solar energy collector heat transfer surface 43 will contact solar energy collector phase change plate 44 through solar energy collector heat transfer thermal pad 48 and heat will flow from solar energy collector 25 to solar energy collector phase change plate 44 and through solar energy collector phase change plate fins 45 into phase change material 46. Phase change material 46 is contained by phase change material bellows 24 and phase change material bellows 24 is attached to solar energy collector phase change plate 44 at solar energy collector bellows seal 47. Modular switch cover 31 shields the operating components of modular thermal switch assembly 30 and solar energy collector assembly 40 from air currents, rain, and other factors that may influence the temperature sensed by modular switch bimetallic element 35 from modular switch shoulder screw 32, but modular switch cover opening 37 in modular switch cover 31 allows solar energy collector 25 to be exposed to solar energy. Modular thermal switch assembly 30 can be inexpensively produced in a variety of temperature ranges by changing to a modular switch bimetallic element set that has a different switch setting. For example, a bat house in an equatorial location would absorb nearly maximum solar energy all day. If modular thermal switch assembly 30 were set too low, say at 90° F., solar energy collector 25 would be in constant contact with solar energy collector phase change plate 44 causing overheating of the bat house which would require constant operation of enclosure thermal switch assembly 50 and enclosure heat sink thermal switch assembly 60 to maintain a proper thermal environment in enclosure bat roost area 74. In some arid equatorial climates the nighttime temperatures may drop very low. This same 90° F. setting of modular thermal switch assembly 30 would allow heat to dissipate through solar energy collector 25 since phase change material 46 would still be above 90° F., and the stored heat energy would be wasted to the environment instead of maintaining the proper temperature in enclosure bat roost area 74. A different setting of modular thermal switch assembly 30 would be used for different latitudes and climates. The method of simply changing modular thermal switch assembly 30 to a modular thermal switch assembly having a different switch point is much easier than painting the bat house different colors, rotating it, and waiting to see if that is the correct color for the sunlight duration and for the local conditions.

Referring now to FIG. 7, the normally open enclosure thermal switch assembly 50 is shown. At normal conditions enclosure switch bimetallic element 56 will lengthen due to the thermal coefficient of expansion. Since enclosure switch bimetallic element 56 is captured by enclosure switch shoulder screw 54 at each end, enclosure switch bimetallic element 56 will act against the force of enclosure switch spring 55 to maintain a gap between enclosure heat transfer thermal pad 57 and enclosure phase change plate 51. Enclosure thermal switch assembly 50 will only close when the temperature of bat house thermal conduit structure 71 sensed by enclosure switch bimetallic element 56 will relax enclosure switch bimetallic element 56 enough so that enclosure switch spring 55 will force enclosure phase change plate 51 into contact with bat house thermal conduit structure 71 through enclosure heat transfer thermal pad 57. The temperature of enclosure phase change plate 51 is a result of the heat energy stored in phase change material 46. Enclosure phase change plate fins 52 acts to transfer the heat energy of phase change material 46 more efficiently into enclosure phase change plate 51. Phase change material 46 is contained by phase change material bellows 24 which is attached to enclosure phase change plate 51 at enclosure switch bellows seal 53. Enclosure thermal switch assembly 50 is set at a switch temperature of about 100° F. to maintain a desired temperature of 95° F. inside enclosure bat roost area 74.

Referring to FIG. 9 the enclosure heat sink thermal switch assembly 60 is shown. Enclosure heat sink thermal switch assembly 60 is a normally open thermal switch. When the temperature of enclosure rear wall 72 exceeds the set point of enclosure heat sink thermal switch assembly 60, heat sink switch bimetallic element 63 will attempt to lengthen due to the coefficient of thermal expansion. The resulting force will push against heat sink switch shoulder screw 61 at both ends of heat sink switch bimetallic element 63. Since heat sink switch bimetallic element 63 is captured at each end by heat sink switch shoulder screw groove 62, heat sink switch bimetallic element 63 can not grow longer, and will deflect in a predisposed direction. Therefore heat sink switch bimetallic element 63 will push against heat sink land 67 and act against the force of heat sink switch spring 66. When the force of heat sink switch bimetallic element 63 overcomes the force of heat sink switch spring 66, heat sink 64 will contact enclosure rear wall 72 through heat sink heat transfer thermal pad 68 and heat will flow from enclosure rear wall 72 to heat sink 64 and through heat sink fins 65 to the ambient environment. When the thermal energy in enclosure rear wall 72 has dissipated to the environment, heat sink switch bimetallic element 63 will contract and the force of heat sink switch spring 66 will again open a gap between enclosure rear wall 72 and heat sink 64 allowing rear wall 72 and therefore bat house enclosure assembly 70 to maintain a desired temperature.

Referring now to FIG. 8 the bat house enclosure assembly 70 is shown. Heat energy travels from bat house thermal conduit structure 71 into enclosure rear wall 72 and a plurality of roost heat transfer conduit 75. The heat then travels from roost heat transfer conduit 75 through roost thermal adhesive 76, to roost natural surface 77 and into the static air of enclosure bat roost area 74.

Referring now to FIG. 2, solar energy collector 25 is rotated to a position slightly below perpendicular to the sun's rays when the sun is at maximum altitude during the summer season. Phase change material bellows 24 will accommodate the movement of solar energy collector 25 relative to natural surface exterior 21. The altitude rotation of solar energy collector 25 can be found by matching modular switch sun altitude indicator mark 39 shown in FIG. 4 with sun altitude indicator 26. If solar energy collector 25 were only perpendicular to the sun at maximum altitude, it would miss maximum perpendicularity at all other times of the day. By positioning solar energy collector 25 somewhat below the sun's maximum altitude, solar energy collector 25 will receive a greater period of near perpendicularity and two instances of maximum perpendicularity every day. A look-up table can be provided to the user to that lists the desired altitude setting of solar energy collector 25 for different cities or latitudes. When solar energy collector 25 is positioned properly, thumbscrew 27 is inserted into thumbscrew threaded hole 41 shown in FIG. 6 passing through modular switch sun altitude indicator hole 38 shown in FIG. 4. Thumbscrew 27 is tightened to lock solar energy collector 25 into proper position.

In actual use, solar energy collector 25 will absorb a maximum amount of solar energy. If solar energy collector phase change plate 44 is too cold, solar energy collector assembly 40 will change from open to closed and heat will be transferred from solar energy collector 25 through solar energy collector assembly 40 and into phase change material 46. If bat house enclosure assembly 70 is too cold enclosure thermal switch assembly 50 will change from open to closed and heat will be transferred from phase change material 46 through enclosure phase change plate 51 into bat house thermal conduit structure 71 and into enclosure bat roost area 74, thereby raising the temperature of the internal environment.

The temperature of phase change material 46 will rise with sun exposure until the temperature reaches the transition temperature of phase change material 46. At this temperature, phase change material 46 will go through a phase change from a solid into a liquid. During this transition phase change material 46 will absorb a great quantity of heat without increasing in temperature. If the quantity of solar energy is great enough to liquefy all of phase change material 46 the temperature of phase change material 46 will again rise. When there is no sun exposure and enclosure bat roost area 74 begins to cool below the desired temperature set point, the closed solar energy collector assembly 40 will open to prevent heat dissipation from phase change material 46 into the environment and the stored heat will be transferred through enclosure thermal switch assembly 50 and into enclosure bat roost area 74 until phase change material 46 has again phase changed from a liquid into a solid.

If during maximum solar exposure phase change material 46 becomes completely liquefied and rises to too high a temperature, the temperature of enclosure rear wall 72 will increase to the set point of enclosure heat sink thermal switch assembly 60. Enclosure heat sink thermal switch assembly 60 which is normally open will close and the excess heat will be transferred from enclosure rear wall 72 to heat sink 64 and into the environment.

DESCRIPTION—ADDITIONAL EMBODIMENT

Referring to FIG. 10 an additional embodiment of the present invention is shown as additional embodiment dog house assembly 80. The heat dissipating side of the dog house assembly is shown. The additional embodiment dog house assembly has a dog house surface exterior 81. One wall of the exterior surface has a dog house entry opening 82. A large heat sink 86 controlled by a thermal switch (not shown) may be used to dissipate excess thermal energy to the ambient environment. A phase change material bellows 83 allows a solar energy collector 84 to be rotated to an angle matching the sun's altitude. A sun altitude indicator 85 shows the angle of solar energy collector 84. Phase change material bellows 83 should be constructed of a flexible material that will maintain flexibility throughout its lifetime in an outdoor environment with direct sun exposure. Solar energy collector 84 should be constructed from a thermally conductive material such as aluminum. The collector should be painted, anodized, or some other process whereas the exterior surface will absorb the maximum amount of solar energy. The material used to construct sun altitude indicator 26 is unimportant. The heat sink is constructed of a thermally conductive material such as aluminum. Dog house surface exterior 81 is built on a thermal structure similar to bat house thermal conduit structure bat house thermal conduit structure 71 (not shown). The material used to construct dog house surface exterior 81 is unimportant because synthetic outer walls will not dissuade dogs from using the dog house.

OPERATION—ADDITIONAL EMBODIMENT

An additional embodiment dog house assembly 80 operates identically to preferred embodiment bat house assembly 20. Dogs prefer a cooler environment than bats so modular thermal switch assembly 30 would be changed to a lower temperature range. During the summer months, the excess heat will be transferred to heat sink 64 which is located on the shaded side of additional embodiment dog house assembly 80 and into the environment, cooling additional embodiment dog house assembly 80 to a comfortable temperature.

CONCLUSIONS, RAMIFICATIONS, and SCOPE

Thus the reader will see that the present invention by using three thermal switches overcomes the limitations of previous designs. Replacing modular thermal switch assembly 30 with another modular thermal switch assembly having a different set point to suit the local climate is novel and substantially lowers the manufacturing costs over making modular thermal switch assembly 30 adjustable for a range of temperatures. This universal design also saves time when determining the correct amount of solar energy needed to achieve the preferred temperature of enclosure bat roost area 74.

While the above description contains many specificities, these should not be construed as limitations on the scope of the invention, but rather as an exemplification of one preferred embodiment thereof. Many other variations are possible. For example, the three thermal switch invention can be used to limit the temperature range of sealed or unsealed enclosures containing electronic components; in addition to bat houses and dog houses many other animal habitats may benefit from the invention.

Accordingly, the scope of the invention should be determined not by the embodiments illustrated, but by the appended claims and their legal equivalents.

What is claimed is:

1. An enclosure arranged for solar heating, positioned to have a sunny side and a shaded side, comprising:
    (a) a generally closed structure providing an interior with a single or plurality of entry and exit points and at least one upright wall facing the sun;
    (b) said upright wall including solar radiation absorbing means;
    (c) a heat storage unit arranged adjacent the upright wall and in heat transfer relation therewith and in heat transfer relation to the interior of the enclosure;
    (d) said enclosure containing a thermal switch to allow or prohibit heat transfer from the heat storage unit to the solar radiation absorbing means, and from the solar radiation absorbing means to the interior of the enclosure;
    (e) said enclosure containing a thermal switch to allow or prohibit heat transfer from the heat storage unit to the to the interior of the enclosure;
    (f) said enclosure containing a thermal switch to allow or prohibit heat transfer from the interior of the enclosure to the ambient environment.

2. A structure according to claim 1 wherein said structure is multi-floored;
    (a) said enclosure having all interior compartments at nearly identical temperatures.

3. A structure according to claim 1 wherein said structure has a multi-walled interior;
    (a) said enclosure having all interior compartments at nearly identical temperatures.

4. A structure according to claim 1 wherein said structure has a multi-walled interior.

* * * * *